United States Patent

[11] 3,624,608

[72] Inventors: Manfred Altman
15 W. Montgomery Ave. Apt. 3B, Bala Cynwyd, Pa. 19004;
Donald Friedman, 4628 Via Coennita, Santa Barbara, Calif. 93105
[21] Appl. No. 44,056
[22] Filed June 8, 1970
[45] Patented Nov. 30, 1971

[54] VEHICLE SHARED-USE SYSTEM
8 Claims, 2 Drawing Figs.

[52] U.S. Cl. .................................................. 340/149 A, 235/61.7, 340/152
[51] Int. Cl. ..................................................... G06k17/00, H04q 9/00
[50] Field of Search............................................ 340/149, 152; 235/61.7, 150.2, 150.24, 61.6; 255/151; 194/4

[56] References Cited
UNITED STATES PATENTS
3,536,109 10/1970 Ginsburgh .................... 235/151 X
3,541,308 11/1970 Ruby ............................ 235/61.6

Primary Examiner—Donald J. Yusko
Attorney—Christie, Parker & Hale

ABSTRACT: A system is described having a plurality of vehicles, the use of which is available to a number of individuals. An identification and information system is provided for regulating vehicle access, recording the time any individual uses a vehicle, and also the extent of use so that billing and other control functions can be performed at a central processing facility. In this system the access to a vehicle is controlled by a credit card or the like in possession of a user. Vehicle identification and mileage are recorded in the vehicle and upon command are transmitted by a sonic or electromagnetic radiation link to a receiving antenna from which these data and the user identification are transmitted by phone lines to a central processing station. The potential user's credit is verified and, if approved, the vehicle is permitted to leave the rental site.

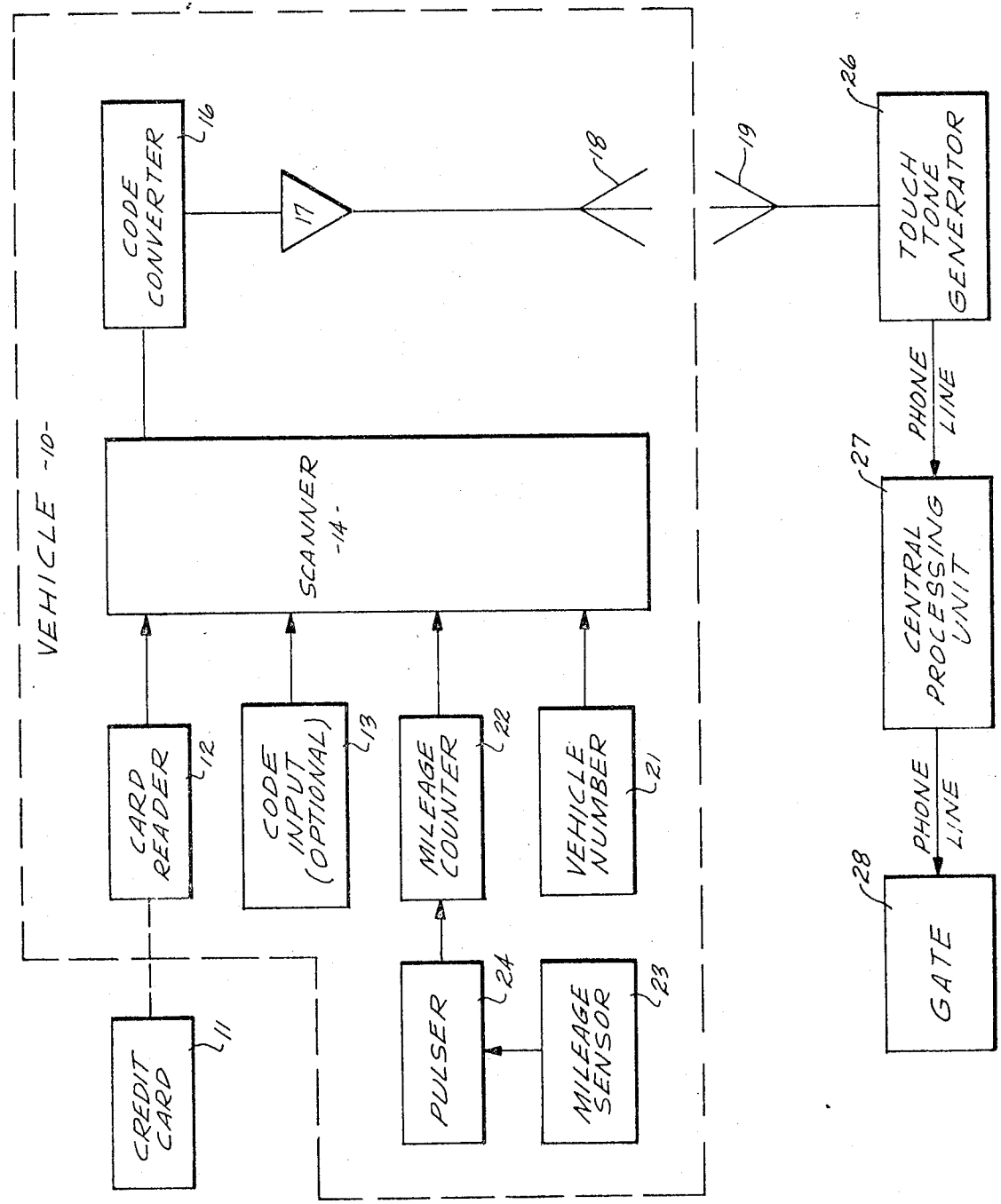

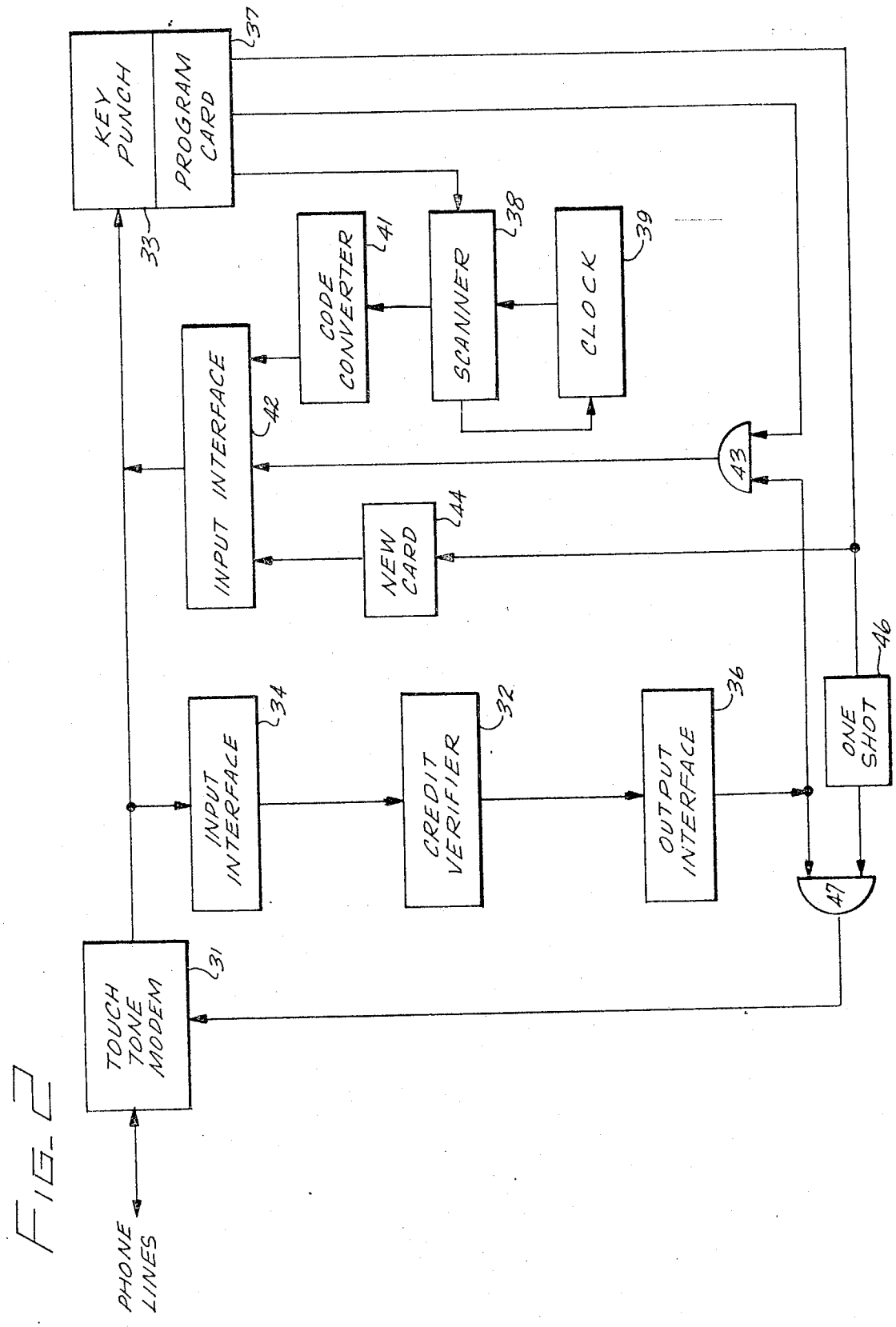

3,624,608

VEHICLE SHARED-USE SYSTEM

BACKGROUND

This application is related to copending patent application Ser. No. 44,055, filed on the same day as this application, titled AUTOMOBILE RENTAL SYSTEM, by Donald Friedman, Robin Nicholls, Charles Wood, Howard A. Wilcox, and Nicholas DiNapoli, which is hereby incorporated by reference.

The number of cars on the streets and highways in this country has proliferated in recent years since people have found them to be the most versatile mode of transportation. Many families have two cars, one of which is employed principally for commuting to and from work or the like, and the other of which is available for family use on a demand basis. This often amounts to an inefficient use of the vehicles since one may be employed only for a morning and an afternoon trip and the other may sit idle for long periods when there is no demand for use.

There has, therefore, developed the desirability of employing a number of vehicles available to a number of individuals on a demand basis. Since the average number of people having access to each vehicle is increased because the use is shared, the number of families requiring a second car can be substantially reduced. Such a system may also make available cars to certain families who cannot afford to own a vehicle. Naturally there are many problems associated with implementation of a system of shared use of vehicles; however, the advantages make the effort justified.

Preferably, the shared-use vehicles are small and substantially similar so that they occupy less parking space than many current vehicles. This is quite feasible since, in general, these cars would be used solely for relatively short trips in and around urban areas. Since the use is so limited, special power plants employing hybrid electric and internal combustion systems can be employed for reduced emissions and minimization of pollution of the urban environment. Because the vehicles are substantially similar to each other, parking facilities can be greatly simplified and even automated so that the vehicles are continually rotated on a first-in, first-out basis rather than the random access required in present systems wherein each owner is associated with a particular vehicle. The similarity of vehicles also simplifies and makes more economical the necessary maintenance.

One of the problems in implementing a system of this sort is means for controlling access to the vehicles and billing the users for the actual usage of the vehicles. In order to achieve widespread acceptance, the system must have a plurality of remote stations convenient to population and work centers. In order to provide such convenience, a large number of small stations will have greater public acceptance than a few relatively larger stations not as conveniently located. With a large number of small stations it is infeasible to provide continual manning of the station for access and information purposes. It is important to keep the cost to the user substantially below the cost of owning his own car.

It, therefore, becomes of importance to provide an inexpensive automatic system capable of handling the diverse situations of users, vehicles, and the like. Time is required for implementing a system of this nature, and it is therefore desirable that the system be one that can operate with existing vehicles for some period in order to provide a smooth transition to a system wherein substantially standardized small vehicles are widely employed in the shared-use system.

BRIEF SUMMARY OF THE INVENTION

Therefore, in practice of this invention according to a presently preferred embodiment there is provided an automatic information system for a shared-use vehicle system having a plurality of remote rental stations comprising means for identifying a vehicle user, and a vehicle, and for ascertaining vehicle mileage, means for transmitting the identification and mileage signals to a central processing station, and means for returning the signal to the remote station for controlling access to the vehicles.

DRAWINGS

These and other features and advantages of the present invention will be appreciated as the same becomes better understood by reference to the following detailed description of a presently preferred embodiment when considered in connection with the accompanying drawings wherein:

FIG. 1 illustrates in block form an information system constructed according to principles of this invention; and FIG. 2 illustrates in block form a central processing station for the information system.

DESCRIPTION

FIG. 1 illustrates in block diagram form an information and identification system suitable for use in a vehicle shared-use system. As illustrated in this presently preferred embodiment, access to a vehicle 10 is controlled by means of a credit card 11. The credit card 11 is merely a conventional plastic card or the like having raised indicia, holes, a pattern of magnetic areas, or a pattern of electrically conducted areas, or some other indicia providing coded information. It will be appreciated, of course, that the access control credit card 11 need not be in card form but may be a cylinder, bar, keylike structure or other identification means as may be preferred in a particular embodiment.

The credit card 11 is issued to a potential user of vehicles in a shared-use system, and serves as a means for identifying that individual when he uses the system. Each card contains a unique combination of coded data that identifies the individual and which can be read by automatic equipment to produce electrical signals that can be transmitted to a remote data-processing station. The cards available to the individual users of the system can also include time-limiting codes so that new cards are provided to users on a periodic basis for limiting the possibility of unauthorized access to vehicles. Limitations on the type of vehicle used or priority rating for use may also be included. A potential user would continue to have a credit card available to him so long as his credit standing remained good and he maintained a valid driver's license.

Mounted in the vehicle 10 is a card reader 12 into which the potential user inserts the credit card 11 in order to have use of the vehicle. The card reader 12 is a conventional card-reading mechanism for reading coded information from a card having a pattern of characteristic indicia, such as, apertures, magnetic areas or the like. The card reader 12 is interlocked with the vehicle ignition (not shown), either alone or in combination with a conventional ignition key so that a valid credit card must be inserted in the card reader before the vehicle ignition can be operated.

In addition, if desired, a code input 13 can be provided in conjunction with the card reader 12. This code input can, for example, take the form of a plurality of numbered or lettered buttons that the vehicle user must press in a selected sequence in order to identify himself. The sequence for a particular user is memorized and serves to identify the user and substantially eliminate the possibility of an unauthorized person using a stolen or lost credit card. As mentioned, this is an optional feature that need not be incorporated in the system in all circumstances.

The output of the card reader 12, and the code input 13 if employed, is read by a scanner 14 that is a conventional means for sequentially scanning the information obtained by the card reader and code input, in order to provide an output in the form of a serial stream of information rather than a plurality of parallel information streams.

The serial data output of the scanner 14 is applied to a code converter 16 for converting the data from one number system to another. Thus, for example, it is convenient to employ a decimal code for the card reader, code input, and other information functions hereinafter mentioned, and for data processing or transmission it is more often convenient to employ a binary or octal code. Thus, the input to the code converter 16 may be a decimal code and the output an octal code.

The code converter output is amplified by an amplifier 17 that places the signal train in a suitable condition for transmittal by way of an antenna 18. In this context, the antenna 18 and a corresponding receiving antenna 19 are suitable conventional mechanisms for transmitting sonic or electromagnetic radiation. Thus, for example, the code converter 16 and amplifier 17 may put the information signal train in the form of a low-power, short range radio signal for transmittal by the antenna 18 to the receiving antenna 19. Similarly, the code converter and amplifier may produce a sonic signal of audible or ultrasonic frequencies for transmittal between the two antennas, in which case the "antennas" are conventional speakers and microphones. The code converter and amplifier may take the form of means for generating a light beam for transmitting information from the vehicle to the receiving antenna 19, which would then take the form of a photocell or the like.

It will be recognized that sonic, light, and radio signals may be subject to interference from other similar signals in the environment, and it is therefore preferred that the link between the antennas 18 and 19 be in the form of ultrasonic signals since these are not subject to substantial ambient interference and are also more difficult to simulate and falsify. In addition, ultrasonic signals of low amplitude are not annoying as sonic signals might be.

In addition to the user identification provided by the card reader 12 and code input 13, the vehicle 10 is also outfitted with a recorded vehicle number 21 that is scanned by the scanner 14 for transmittal along with the user identification. The vehicle also includes a mileage counter 22 in the form of a conventional electric, magnetic, or mechanical counter having a signal output suitable for reading by the scanner 14. The mileage counter is connected to a mileage sensor 23 or vehicle odometer by a pulser 24 so that the mileage counter continually keeps track of the mileage use of the vehicle. If desired, some other measure of vehicle usage than mileage can be employed, such as, for example, engine revolutions or the like; however, a mileage measure is consistent with presently available vehicle systems and is well recognized by the public as a useful measure of vehicle usage.

The receiving antenna 19 is connected to a conventional touch tone generator 26 at the station where the potential user acquires access to the vehicle. A station number 25 is also added so that the vehicle rental location is also identified. The touch tone generator converts the signal train from the vehicle into an octal code in the form of several frequencies of oscillation for transmission over a conventional telephone line. The telephone companies have found that such tones are a desirable way of conveying information over the telephone lines, and provision of such a generator in the vehicle access station fits well into existing telephone communication links. It will be recognized that the touch tone generator 26 may be incorporated in the vehicle 10 in the form of the code converter 16, and the touch tones generated thereby transmitted between the antennas 18 and 19 for application to the telephone lines.

The telephone lines are employed for conveying the signal train from the touch tone generator 26 (either directly or by way of the antenna link) to a central processing unit 27 for handling the information. The central processing unit, hereinafter described in greater detail, verifies that the credit card inserted in the vehicle card reader is valid and the holder is an authorized user. If it is ascertained by the central processing unit 27 that the card is currently valid, a signal is transmitted by a conventional telephone line to a gate 28 or the like that permits the vehicle to be removed from the area where it is stored. In addition, the central processing unit records time, vehicle identification, and mileage and computes customer billing from these data.

Thus, for example, a potential user of a shared-use vehicle selects a vehicle from stock in a rental station, such as, for example, adjacent an apartment complex, inserts his credit card 11 in the card reader 12 and, if necessary, punches his own identification in the code input 13. This permits operation of the vehicle ignition so that the user can take the vehicle to a portion of the remote station, adjacent the exit gate for example, where the car antenna 18 is sufficiently close to the station receiving antenna 19 that a signal can be transmitted therebetween. At this point, the scanner 14 reads the credit card information, the code input, the vehicle number and the vehicle mileage and transmits this information by way of the antennas 18 and 19 and conventional telephone lines to the central processing unit 27.

An automatic credit check is made at the central processing unit to verify the validity of the card and code input information, and, if approved, a mechanical gate such as widely employed in parking lots and the like at present is opened. If the potential user is not approved, the gate is not opened, and the vehicle cannot leave the parking area. A conventional telephone link to an operator at the central processing station permits the potential user to communicate with the station if required rather than requiring him to deal solely with a computer directly. When a vehicle is returned to a remote station, either the same or a different one, the identification data and mileage are again read and transmitted to the central processing unit for use in customer billing and inventory control.

FIG. 2 illustrates in block diagram form a typical central processing unit 27 for substantially completely mechanized operation. It will be apparent that greater or lesser degrees of mechanization can be employed as desired. As illustrated in this embodiment, a signal transmitted over the conventional telephone lines is first applied to a touch tone modem 31, a partial function of which is to convert touch tone information into switch closure information suitable for application to a conventional credit verifier 32 and a conventional automatic key punch machine 33. The touch tone modem or modulator-demodulator 31 is a conventional item for converting touch tone information into a binary code for data processing and for converting a binary code back to touch tone information for transmittal over telephone lines to a station remote from the data processor. The keypunch machine is designed to receive information directly from the touch tone modem 31 and record it by means of standard punch cards. It will be apparent, of course, that punch or magnetic tape or other data storage techniques can be employed as desired.

The credit verifier 32 is a conventional apparatus commercially available in a unit employing binary code. An input interface 34 and an output interface 36 are provided for converting the train of information to a suitable format for use by the credit verifier. The credit verifier 32 is responsive only to the first series of digits presented to it in each data transmission sequence, corresponding to the output of the credit card reader and code input from the vehicle (FIG. 1). The numbers so transmitted are compared with a list of internally stored numbers in the credit verifier. In its usual form the credit verifier stores numbers corresponding to potential users having "bad credit" so that if a match is found, the credit verifier provides a "bad credit" signal at the output, while if a match is not found, the credit verifier provides a "good credit" signal at its output. Clearly, the reverse, namely good credit risks, can be stored in the credit verifier if desired for providing acceptance or rejection signals.

While the credit verifier 32 is making comparison with the stored numbers, a train of signals continues to come in by way of the touch tone modem 31 and are applied to the keypunch mechanism 33. The keypunch mechanism records the user identification, the number of the remote station where the car is selected, the vehicle identification number, and the mileage numbers as read from the mileage counter 22 (FIG. 1). These numbers are sequentially punched on a program card 37 that is conveniently employed in conventional computer mechanisms (not shown) for calculating the extent of use in terms of time, mileage or the like for each user, and preparation of suitable periodic bills to the users. Clearly, the data on the punch cards can be employed for a broad variety of other purposes, such as, noting the location of individual vehicles, keeping track of the inventory of vehicles at each station so that vehicles are always available at each site, recording total vehicle usage for assuring routine maintenance as required, and the like.

Although the numerical values of the input numbers to the central processing unit are variable, the digit length of each input is constant. The program card 37 signals as each digit of the remote stations information has been recorded, and this signal is applied to a scanner 38 for passing a pulse from a clock 39 to a code converter 41, and input interface 42 for cycling the keypunch machine 33. This cycle continues repetitively until all of the input digits have been recorded. The clock output is held constant by the scanner 38 during interrogation so that the several digits are sequentially punched by the keypunch. As soon as the final clock digit is punched, the program card 37 applies a signal to an AND-gate 43, the other input of which is the output of the credit verifier 32. The output of the AND-gate 43 is applied to the input interface 42 for application to the keypunch mechanism 33 so that the credit status of the credit card number is also recorded.

As soon as the credit status of the user has been punched by the keypunch 33, the final output conductor is energized by the program card 37 and a new punch card is called for by way of a new card command unit 44 which moves a new card into position in the key punch 33 so that the program card output conductor terminals are all deenergized. The final output also energies a one-shot multivibrator 46 which remains energized for a sufficient time to permit an AND-gate 47 to pass the credit response from the credit verifier 32 to the touch tone modem 31 for transmission to the access gate 28 (FIG. 1) by way of a conventional telephone line. This output credit signal permits or refuses the user to move the vehicle from the parking area by controlling the gate 28.

Thus, it will be seen that the user, station, vehicle identification, and vehicle mileage are recorded as the credit is verified, and after recording the credit status with this other information, the credit status is transmitted to the gate control at the car selection station. When the one-shot 46 deenergizes after a predetermined length of time, the AND-gate 47 closes and the response information to the gate is discontinued. This signal to the telephone system in effect tells the remote vehicle station to "hang up" so that another vehicle selection station connected to the telephone system can record its information and receive a credit response.

Since the various verification and recording steps performed by the central processing unit are principally electronic in nature, very rapid data processing and credit verification can be obtained so that the user can remover the vehicle from the selection station in a very short time, normally only a very few seconds. This rapid access makes the system sufficiently desirable that good user acceptance is obtained. In the absence of such an automatic system, a substantial time may be required to verify credit and record the information needed for properly billing the cost of vehicle use. This requires additional manpower, increases expense, and reduces customer acceptance of vehicle shared-use systems so that they are less effective in reducing urban congestion.

Although limited embodiments of automatic information system for a shared-use vehicle system have been described and illustrated herein, many modifications and variations will be apparent to one skilled in the art. It is, therefore, to be understood that within the scope of the appended claims the invention may be practiced otherwise than specifically described.

What is claimed is:

1. An automatic vehicle shared-use system comprising a plurality of remote vehicle access stations, each station comprising:
   means for identifying a vehicle user and generating an identification signal;
   means for identifying a vehicle and generating a second identification signal;
   means for ascertaining vehicle usage and generating a usage signal; and
   means for controlling access to an identified vehicle; said further comprising:
   central processing means for correlating identification signals and usage signals of a plurality of users and a plurality of vehicles; and
   means for transmitting the identification and usage signals to the central processing means for returning signals to the means for controlling vehicle access.

2. An automatic vehicle shared-use system as defined in claim 1 wherein means for transmitting signals comprises:
   a transmitting antenna mounted on a vehicle; and
   a receiving antenna at the vehicle access station.

3. An automatic vehicle shared-use system as defined in claim 1 wherein the means for transmitting comprises:
   a wired connection between the remote vehicle access station and the central processing means; and
   an ultrasonic signal link between a vehicle and the wired connection.

4. An automatic vehicle shared-use system as defined in claim 1 wherein the means for ascertaining vehicle usage comprises:
   a mileage sensor;
   a pulser means responsive to the mileage sensor for generating signal pulses;
   counter means responsive to the pulser for recording mileage; and
   scanner means for reading the counter.

5. An automatic vehicle shared-use system as defined in claim 4 wherein the means for identifying a user comprises:
   an indicia-bearing member available to a user; and
   reader means for sensing the indicia and generating the identification signal in response thereto.

6. An automatic vehicle shared-use system as defined in claim 5 further comprising scanner means for sequentially reading the identification signals for serial transmission to the central processing means.

7. An automatic vehicle shared-use system as defined in claim 6 wherein the means for transmitting comprises:
   a wire connection between the vehicle access station and the central processing means;
   a transmitting antenna mounted on a vehicle and connected to the scanning means; and
   a receiving antenna at the vehicle access station.

8. An automatic vehicle shared-use system as defined in claim 7 wherein the transmitting and receiving antennas each process ultrasonic signals.

* * * * *